US011089575B2

(12) United States Patent
Yerramalli et al.

(10) Patent No.: US 11,089,575 B2
(45) Date of Patent: Aug. 10, 2021

(54) MULTI-CARRIER ENHANCEMENTS FOR IMPROVING RELIABILITY IN URLLC-U

(71) Applicant: QUALCOMM Incorporated, San Diego, CA (US)

(72) Inventors: Srinivas Yerramalli, San Diego, CA (US); Aleksandar Damnjanovic, Del Mar, CA (US); Xiaoxia Zhang, San Diego, CA (US); Tamer Kadous, San Diego, CA (US); Chih-Hao Liu, San Diego, CA (US); Seyed Ali Akbar Fakoorian, San Diego, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 16/380,778

(22) Filed: Apr. 10, 2019

(65) Prior Publication Data

US 2019/0320424 A1 Oct. 17, 2019

Related U.S. Application Data

(60) Provisional application No. 62/656,262, filed on Apr. 11, 2018.

(51) Int. Cl.
*H04W 4/00* (2018.01)
*H04W 72/04* (2009.01)
*H04L 5/00* (2006.01)

(52) U.S. Cl.
CPC ....... *H04W 72/0406* (2013.01); *H04L 5/0053* (2013.01)

(58) Field of Classification Search
CPC ......... H04W 72/0406; H04W 74/0808; H04W 16/28; H04W 24/00; H04W 48/16;
(Continued)

(56) References Cited

U.S. PATENT DOCUMENTS 10,231,131 B2 * 3/2019 Zhang .................... H04W 72/10
10,264,594 B2 * 4/2019 Koorapaty ............ H04W 48/16
(Continued)

OTHER PUBLICATIONS

Huawei, et al: "Coexistence and Channel Access for NR Unlicensed Band Operations," 3GPP Draft; R1-1803679, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 6, 2018, XP051412957, 7 Pages, Retrieved from the Internet: URL : http://www.3gpp.org/ftp/tsg%5Fran/WG1%5FRL1/TSGR1%5F92b/Docs/ [retrieved on Apr. 6, 2018] sections 2, 3.1, 3.3.
(Continued)

*Primary Examiner* — Stephen M D Agosta
(74) *Attorney, Agent, or Firm* — Liem T. Do

(57) ABSTRACT

In various aspects, a base station and user equipment (UE) exchange an indication of UE capabilities and a monitoring schedule for the UE to monitor an integer M frequency band partitions for a predetermined signal. The base station performs one or more successful clear carrier assessments (CCAs) on an integer N frequency band partitions of the M frequency band partitions, wherein N<M, and maps one or more downlink transmissions to only the N frequency band partitions. Based on the mapping, the base station transmits the predetermined signal on only the N frequency band partitions, followed by a downlink signal during a transmission opportunity (TXOP). The UE cycles through the M frequency band partitions while monitoring for the predetermined signal according to the monitoring schedule, detects the predetermined signal on only the integer N frequency band partitions, and tunes to receive the downlink signal during the TXOP.

26 Claims, 7 Drawing Sheets

(58) Field of Classification Search
CPC .............. H04W 52/0232; H04L 5/0053; H04L
1/0006; H04L 1/06; H04L 27/2613; H04B
7/0408; H04B 7/0619; H04B 7/0695;
H04B 7/088
See application file for complete search history.

(56) References Cited

U.S. PATENT DOCUMENTS

| | | | | |
|---|---|---|---|---|
| 10,425,826 | B2* | 9/2019 | Fakoorian | H04W 28/0289 |
| 10,433,180 | B2* | 10/2019 | Zhang | H04W 74/02 |
| 10,455,455 | B2* | 10/2019 | Yoo | H04W 74/0816 |
| 10,687,355 | B2* | 6/2020 | Yoo | H04W 16/14 |
| 2007/0047666 | A1* | 3/2007 | Trachewsky | H04L 27/2613 375/267 |
| 2010/0265922 | A1* | 10/2010 | Bracha | H04W 74/0808 370/336 |
| 2011/0103352 | A1* | 5/2011 | Wentink | H04W 74/008 370/336 |
| 2016/0128029 | A1* | 5/2016 | Yang | H04L 27/2627 370/329 |
| 2016/0227578 | A1* | 8/2016 | Lee | H04W 74/0816 |
| 2016/0302203 | A1 | 10/2016 | Liu et al. | |
| 2017/0048738 | A1* | 2/2017 | Wang | H04W 24/10 |
| 2017/0303144 | A1* | 10/2017 | Guo | H04W 74/0808 |
| 2018/0242234 | A1* | 8/2018 | Semaan | H04W 48/18 |
| 2020/0077441 | A1* | 3/2020 | Madhavan | H04L 5/0055 |

OTHER PUBLICATIONS

Huawei, et al: "Numerology and Wideband Operation in NR Unlicensed," 3GPP Draft; R1-1803677, 3rd Generayion Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 6, 2018, XP051412955, 8 pages, Retrieved from the Internet: URL: http://www.3gpp.org/ftp/tsg%5Fran/WG1%5FRL1/TSGR1%5F92b/Docs/ [retrieved on Apr. 6, 2018] section 3.2.

Intel Corporation: "CA BW Class Definition," 3GPP Draft; R4-1800162—CA BW Class Definition, 3rd Generation Partnership Project (3GPP), Mobile Competence Centre; 650, Route Des Lucioles; F-06921 Sophia-Antipolis Cedex; France, vol. RAN WG4, No. San Diego, California, USA; Jan. 22, 2018-Jan. 26, 2018, Jan. 15, 2018, XP051388521, 4 pages, Retrieved from the Internet: URL: http://www.3gpp.org/ftp/tsg%5Fran/WG4%5FRadio/TSGR4%5FAHs/TSGR4%5FAH%2D1801/Docs/ [retrieved on Jan. 15, 2018] sections 2.1, 2.2.

International Search Report and Written Opinion—PCT/US2019/027006—ISA/EPO—dated Jun. 14, 2019.

* cited by examiner

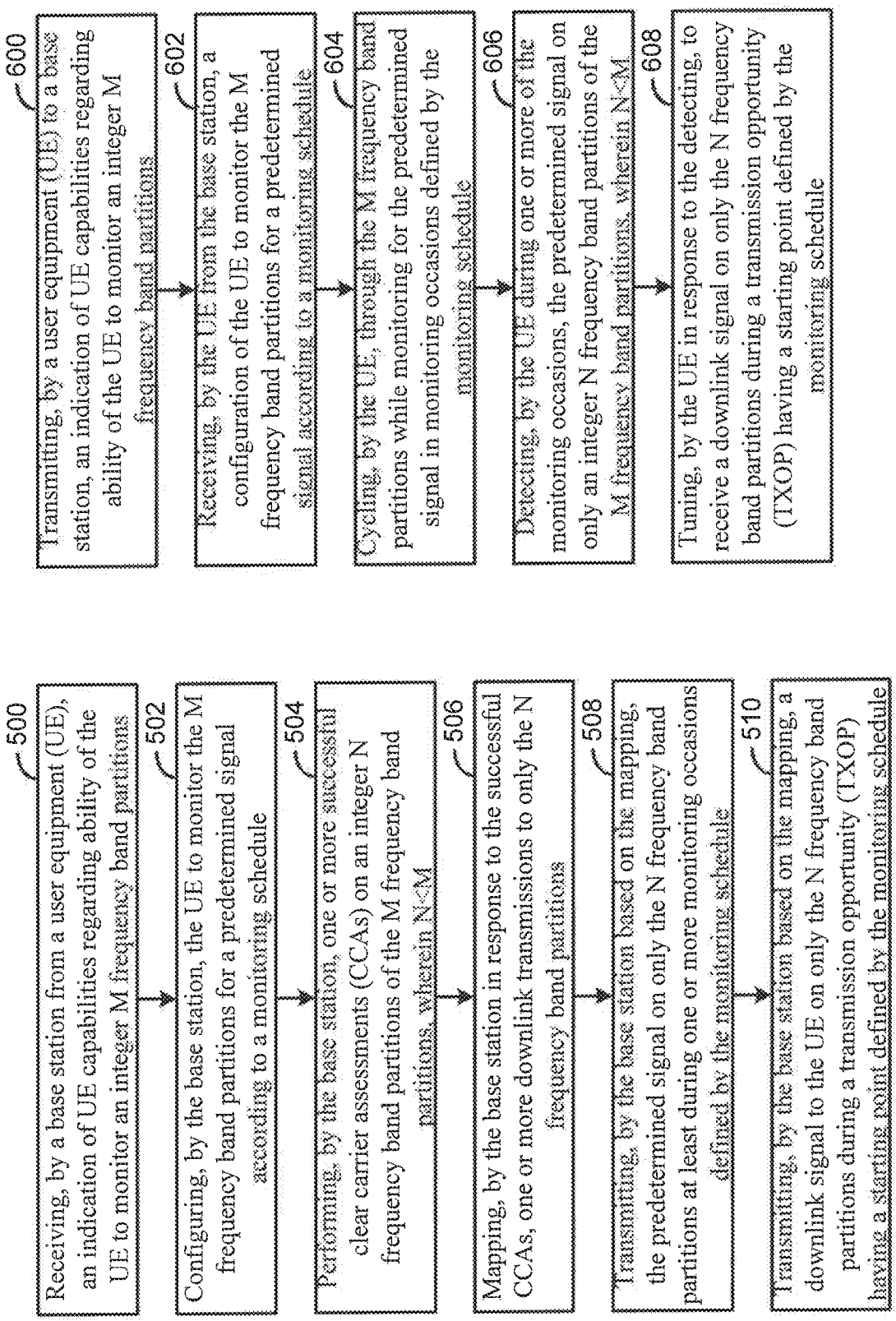

MULTI-CARRIER ENHANCEMENTS FOR IMPROVING RELIABILITY IN URLLC-U

CROSS-REFERENCE TO RELATED APPLICATIONS

The present disclosure claims priority to U.S. Provisional Patent Application No. 62/656,262, entitled "MULTI-CARRIER ENHANCEMENTS FOR IMPROVING RELIABILITY IN URLLC-U," filed Apr. 11, 2018, the disclosure of which is hereby incorporated herein by reference in its entirety for any and all purposes.

TECHNICAL FIELD

Aspects of the present disclosure relate generally to wireless communication systems, and more particularly, to use of a preamble to signal downlink transmission on one or more frequency bandwidth partitions, such as carriers or band width parts (BWPs), among a set of a larger number of frequency bandwidth partitions monitored by a user equipment (UE).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. For example, a method can include receiving, by a base station from a user equipment (UE), an indication of UE capabilities regarding ability of the UE to monitor an integer M frequency band partitions. The method may additionally include configuring, by the base station, the UE to monitor the M frequency band partitions for a predetermined signal according to a monitoring schedule. The method may also include performing, by the base station, one or more successful clear carrier assessments (CCAs) on an integer N frequency band partitions of the M frequency band partitions, wherein N<M. The method may further include mapping, by the base station in response to the successful CCAs, one or more downlink transmissions to only the N frequency band partitions. The method may further include transmitting, by the base station based on the mapping, the predetermined signal on only the N frequency band partitions at least during one or more monitoring occasions defined by the monitoring schedule. The method may further include transmitting, by the base station based on the mapping, a downlink signal to the UE on only the N frequency band partitions during a transmission opportunity (TXOP) having a starting point defined by the monitoring schedule.

In another aspect, a method of wireless communication may include transmitting, by a user equipment (UE) to a base station, an indication of UE capabilities regarding ability of the UE to monitor an integer M frequency band partitions. The method may additionally include receiving, by the UE from the base station, a configuration of the UE to monitor the M frequency band partitions for a predetermined signal according to a monitoring schedule. The method may also include cycling, by the UE, through the M frequency band partitions while monitoring for the predetermined signal in monitoring occasions defined by the monitoring schedule. The method may further include detecting, by the UE during one or more of the monitoring occasions, the predetermined signal on only an integer N frequency band partitions of the M frequency band partitions, wherein N<M. The method may further include tuning, by the UE in response to the detecting, to receive a downlink signal on only the N frequency band partitions during a transmission opportunity (TXOP) having a starting point defined by the monitoring schedule.

In another aspect, a non-transitory computer-readable medium has program code recorded thereon that, when executed, causes a processor to perform wireless communication. The program code may, for example, include code for receiving an indication of UE capabilities regarding ability of the UE to monitor an integer M frequency band partitions. The program code may additionally include code for configuring the UE to monitor the M frequency band partitions for a predetermined signal according to a monitoring schedule. The program code may also include code for performing one or more successful clear carrier assessments (CCAs) on an integer N frequency band partitions of the M frequency band partitions, wherein N<M. The program code may further include code for mapping one or more downlink transmissions to only the N frequency band partitions. The program code may further include code for transmitting the predetermined signal on only the N frequency band partitions at least during one or more monitoring occasions defined by the monitoring schedule. The program code may further include code for transmitting a downlink signal to the UE on only the N frequency band partitions during a transmission opportunity (TXOP) code for having a starting point defined by the monitoring schedule.

In another aspect, a non-transitory computer-readable medium has program code recorded thereon that, when executed, causes a processor to perform wireless communication. The program code may include code for transmitting an indication of UE capabilities regarding ability of the UE to monitor an integer M frequency band partitions. The program code may additionally include code for receiving a configuration of the UE to monitor the M frequency band partitions for a predetermined signal according to a monitoring schedule. The program code may also include code for cycling through the M frequency band partitions while monitoring for the predetermined signal in monitoring occasions defined by the monitoring schedule. The program code may further include code for detecting the predetermined signal on only an integer N frequency band partitions of the M frequency band partitions, wherein N<M. The program code may further include code for tuning to receive a downlink signal on only the N frequency band partitions during a transmission opportunity (TXOP) having a starting point defined by the monitoring schedule.

In another aspect, an apparatus configured for wireless communication has means for receiving an indication of UE capabilities regarding ability of the UE to monitor an integer M frequency band partitions. The apparatus additionally has means for configuring the UE to monitor the M frequency band partitions for a predetermined signal according to a monitoring schedule. The apparatus also has means for performing one or more successful clear carrier assessments (CCAs) on an integer N frequency band partitions of the M frequency band partitions, wherein N<M. The apparatus further has means for mapping one or more downlink transmissions to only the N frequency band partitions. The apparatus further has means for transmitting the predetermined signal on only the N frequency band partitions at least during one or more monitoring occasions defined by the monitoring schedule. The apparatus further has means for transmitting a downlink signal to the UE on only the N frequency band partitions during a transmission opportunity (TXOP) having a starting point defined by the monitoring schedule.

In another aspect, an apparatus configured for wireless communication has means for transmitting an indication of UE capabilities regarding ability of the UE to monitor an integer M frequency band partitions. The apparatus additionally has means for receiving a configuration of the UE to monitor the M frequency band partitions for a predetermined signal according to a monitoring schedule. The apparatus also has means for cycling through the M frequency band partitions while monitoring for the predetermined signal in monitoring occasions defined by the monitoring schedule. The apparatus further has means for detecting the predetermined signal on only an integer N frequency band partitions of the M frequency band partitions, wherein N<M. The apparatus further has means for tuning to receive a downlink signal on only the N frequency band partitions during a transmission opportunity (TXOP) having a starting point defined by the monitoring schedule.

An apparatus configured for wireless communication has at least one processor and a memory coupled to the at least one processor. The at least one processor is configured to receive, by a base station from a user equipment (UE), an indication of UE capabilities regarding ability of the UE to monitor an integer M frequency band partitions. The at least one processor is additionally configured to configure, by the base station, the UE to monitor the M frequency band partitions for a predetermined signal according to a monitoring schedule. The at least one processor is also configured to perform, by the base station, one or more successful clear carrier assessments (CCAs) on an integer N frequency band partitions of the M frequency band partitions, wherein N<M. The at least one processor is further configured to map, by the base station in response to the successful CCAs, one or more downlink transmissions to only the N frequency band partitions. The at least one processor is further configured to transmit, by the base station based on the maps, the predetermined signal on only the N frequency band partitions at least during one or more monitoring occasions defined by the monitoring schedule. The at least one processor is further configured to transmit, by the base station based on the maps, a downlink signal to the UE on only the N frequency band partitions during a transmission opportunity (TXOP) having a starting point defined by the monitors schedule.

In another aspect, an apparatus configured for wireless communication has at least one processor and a memory coupled to the at least one processor. The at least one processor is configured to transmit, by a user equipment (UE) to a base station, an indication of UE capabilities regarding ability of the UE to monitor an integer M frequency band partitions. The at least one processor is additionally configured to receive, by the UE from the base station, a configuration of the UE to monitor the M frequency band partitions for a predetermined signal according to a monitoring schedule. The at least one processor is further configured to cycle, by the UE, through the M frequency band partitions while monitoring for the predetermined signal in monitoring occasions defined by the monitoring schedule. The at least one processor is further configured to detect, by the UE during one or more of the monitors occasions, the predetermined signal on only an integer N frequency hand partitions of the M frequency band partitions, wherein N<M. The at least one processor is further configured to tune, by the UE in response to results of the configuration of the at least one processor to detect, to receive a downlink signal on only the N frequency band partitions during a transmission opportunity (TXOP) having a starting point defined by the monitoring schedule.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a block diagram illustrating example blocks of a wireless communication procedure carried out by a base station configured according to some embodiments of the present disclosure.

FIG. 6 is a block diagram illustrating example blocks of a wireless communication procedure carried out by a UE configured according to some embodiments of the present disclosure.

DETAILED DESCRIPTION

Figure 1:
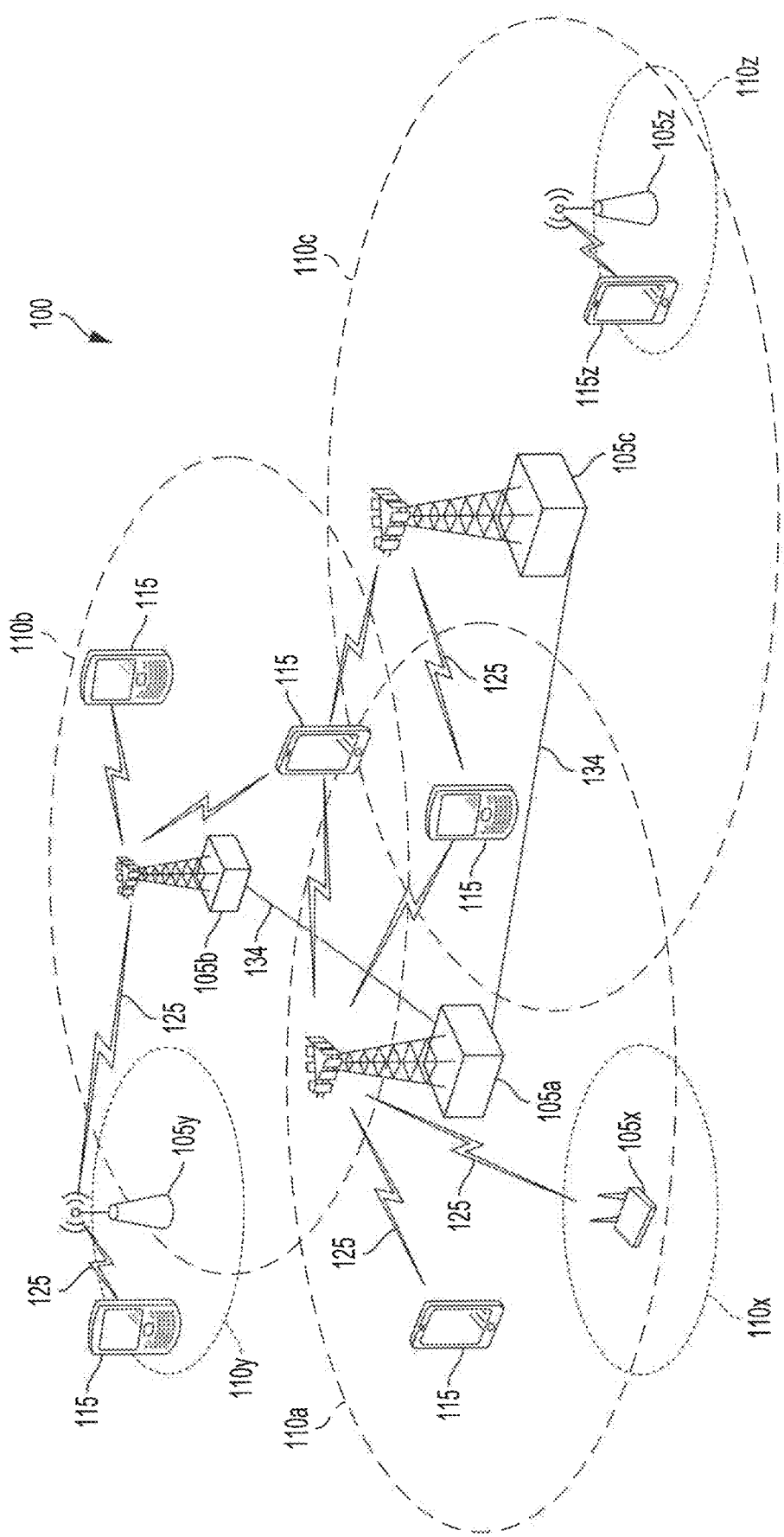
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
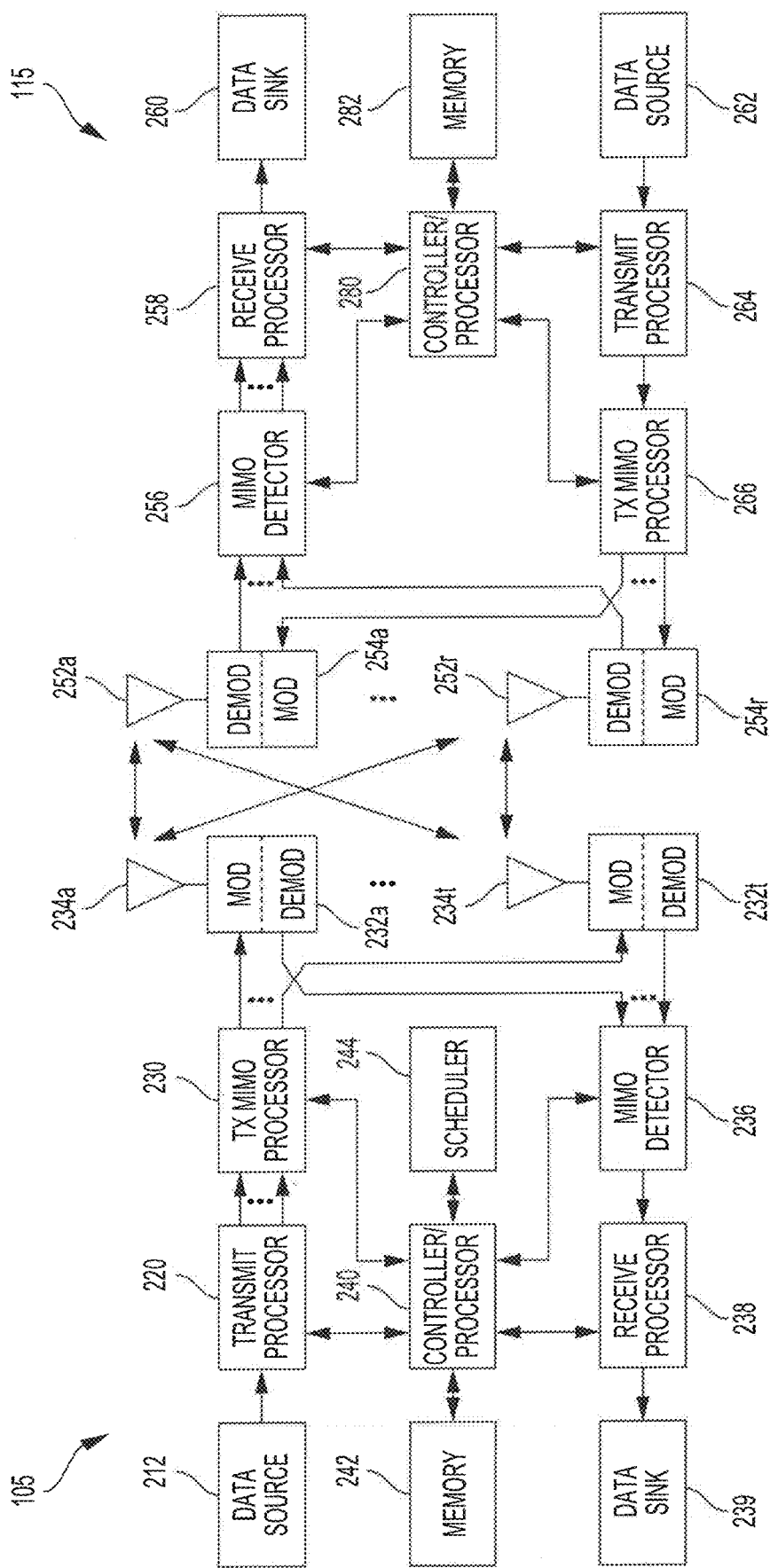
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MEM detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 3-8 and/or other processes for the techniques described herein. Memories 242 and 282 may store data and program codes for gNB 105 and UE 115, respectively. Scheduler 244 may schedule UEs for data transmission on the downlink and/or uplink.

Using multiple carrier transmission is one of the key aspects to increasing reliability in ultra reliable and low latency communications (URLLC) and URLLC in the unlicensed band (URLLC-U) systems. Some concepts for using multi-carrier transmission to improve reliability have been previously discussed. For example, packet duplication at the packet data convergence protocol (PDCP) level may be used. However, the radio link control (RLC) re-transmission may not satisfy latency requirements for URLLC due to delay constraints. Accordingly, duplicated packets are mapped onto different carriers, and media access control (MAC) enhancements are proposed so that a same packet is not mapped onto the same carrier or multiplexed onto the same physical layer (PHY) packet data unit (PDU).

The present disclosure details some novel aspects of multi-carrier transmissions especially in unlicensed spectrum to improve reliability. For example, multi-carrier and/or band width part (BMP) downlink transmission may be detected by a UE that expects to receive and process the transmissions over only a subset of those carriers and/or BWPs that are monitored by the UE. It is assumed that high reliability UEs can process most baseband (PHY control and data channels and other reference signals such as demodulation reference signals (DMRS) and channel state information reference signals (CSI-RS)) from N carriers, but can process all RF/passband transmissions and some minimal baseband functions from M carriers (where M>N). It may be noted that, when M=N, this case can be considered as carrier aggregation operation, and hence, the proposed solutions may be viewed as a generalization to the CA framework.

Figure 3:
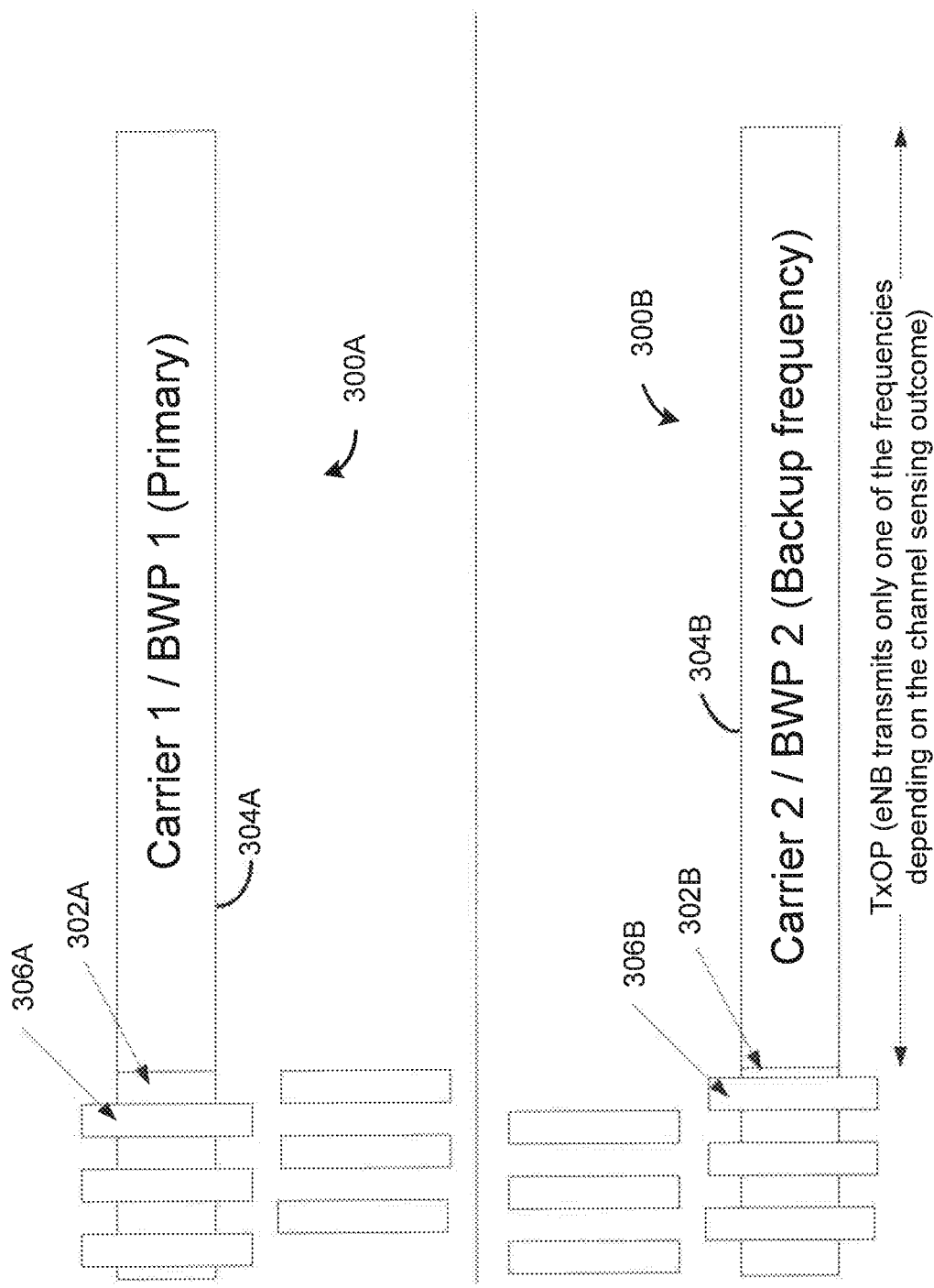
FIG. 3 is a block diagram illustrating use of a preamble to signal downlink transmission on one or more frequency bandwidth partitions, such as carriers or band width parts (BWPs), among a set of a larger number of frequency bandwidth partitions monitored by a user equipment (UE) configured according to some embodiments of the present disclosure.

FIG. 3 illustrates an example of UE and base station operation for a case in which M=2 and N=1. When a base station successfully performs clear channel assessment (CCA) on a primary frequency band partition 300A of the M frequency band partitions 300A and 300B, then the base station may transmit a predetermined signal, such as a long preamble 302A, on the primary frequency band partition, followed by the downlink transmission in a transmission opportunity (TXOP) 304A on the primary frequency band partition 300A. The UE may scan the primary frequency band partition 300A and a backup frequency band partition 300B in monitoring occasions 306A and 306B according to a monitoring schedule. Upon detecting the long preamble 302A in the monitoring occasions 306A, the UE knows to expect the downlink transmission in the TXOP 304A on the primary frequency band partition 300A.

Once the downlink transmission in TXOP 304A is complete, the base station again attempts to clear the medium on the primary frequency band partition 300A, but fails to do so. Accordingly, the base station then performs a successful CCA on the backup frequency band partition 300B and transmits the long preamble 302B in the monitoring period on the backup frequency band partition 300B. The UE, upon detecting the long preamble in the monitoring occasions 300B, knows to expect the downlink transmission in TXOP 304B on the backup frequency band partition 300B. Accordingly, the UE may tune to the backup frequency band partition 300B to receive the downlink transmission in the TXOP 304B.

According to the proposed operation of the gNB and the UE, it is envisioned that the gNB configures the UE with one or more BWPs or carriers, and that the gNB configures the UE to monitor for the preamble in up to M carriers, where M is the UE capability signaled to the gNB. The UE does not expect transmission by the gNB in more than N carriers at a time, but if the gNB transmits on more than N carriers, it can indicate to the UE a priority list of the carriers that the UE should monitor. This priority list can be semi-statically configured or changed somewhat dynamically. Based on the values of M & N, the gNB configures a preamble monitoring schedule for the UE on various carriers and/or BWPs. Once the UE detects the preamble, it can continue with PDCCH detection and data decoding on that carrier/BWP or sot of carriers/BWPs.

As shown in FIG. 3, in the example where M=2 and N=1 (primary and backup frequencies), a monitoring schedule may be determined based on various constraints. For example, if the preamble can be detected by monitoring in one symbol, then UE may monitor every alternative symbol on each carrier until it detects the preamble. Alternatively or additionally, if the UE needs one symbol to re-tune between one frequency and the other, then the UE may monitor every alternate mini-slot on each carrier. An example schedule may include monitoring symbol 0 on carrier 1, symbol 1 for retuning to carrier 2, monitoring symbol 2 on carrier 2, symbol 3 for retuning back to carrier 1, and so forth. It may be noted that, if the frequencies are close to each other, the UE many not need to perform retuning. In another example, for M=3 and N=1, the UE may monitor every third symbol or mini-slot on each carrier. In general, for different values of (M, N) the UE preamble monitoring schedule can be appropriately determined. It may also be noted that the monitoring schedule need not be symmetric for all carriers and may be different for different UEs.

Preferably, the preamble should be long enough to allow the UE to detect the transmission in one of the monitoring occasions. While it may be possible to transit the preamble only during the monitoring occasions, it is preferred to transmit the preamble throughout the monitoring period and beyond, up to the start of the TXOP, so that other base stations will not be able to perform successful CCA on the acquired frequency band partition. In this way the predetermined signal, such as a long preamble, may serve as a channel usage beacon signal (CUBS) that may be transmitted by the base station immediately upon successful CCA in order to cause subsequent CCA attempts by other contenders on that medium to fail.

An option for long preamble design is to take a basic preamble within a symbol and repeat it multiple times over many symbols. A cell-specific cover code or a symbol specific phase shift can also be included on top of the repetition. If the UE is aware of the cover code or phase shift, it may combine the repetitions from multiple symbols coherently. Otherwise, the UE can combine non-coherently (i.e., without knowledge of the phase differential between the two symbols). The number of repetitions may be at least what is needed for the UE to cycle through all of the monitoring frequencies. It may be noted that the preamble only serves to detect the transmission, not to provide timing synchronization as in WIFI™.

Figure 4B:
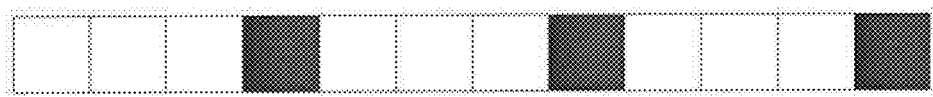
FIG. 4B is a block diagram illustrating a radio frequency symbol of a basic preamble formed by repetitions of a multi-port CSI-RS configured according to some embodiments of the present disclosure.
Figure 4A:
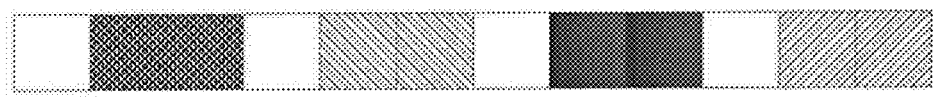
FIG. 4A is a block diagram illustrating a radio frequency symbol of a basic preamble formed by repetitions of a single port channel state information reference signal (CSI-RS) configured according to some embodiments of the present disclosure.

Turning to FIG. 4A, it is envisioned that a one port CSI-RS may be used for the long preamble. If no additional data is multiplexed in this symbol, then the transmission can be detected in the time domain using correlation due to the properties of time-frequency transformation. In WIFI™, the preamble is fixed and independent of transmission time. However, typically the CSI-RS scrambling changes as a function of the transmission instance. One possibility is that the UE changes the correlation sequence depending on the OFDM symbol & slot index at which it performs detection. This approach is more computationally expensive. Another possibility is that the CSI-RS scrambling, just for this preamble signal, may remain fixed for a given cell/BWP. The drawback of one-port CSI-RS is that transmission from a single port reduces the amount of diversity.

Referring to FIG. 4B, it is also envisioned that a multi-port CSI-RS may be used for the long preamble. Depending on the configuration and multiplexing of the different ports, the UE may have to perform detection either in the time domain or in the frequency domain. Frequency domain detection may provide more multiplexing opportunities for a larger number of ports. This approach can be more robust than single port CSI-RS and provide much higher probability of detection due to the diversity provided by additional CSI-RS ports. As with the single port CSI-RS, the multi-port CSI-RS may have a changing correlation sequence depending on the OFDM symbol and slot index at which the UE performs detection, or the CSI-RS scrambling, just for this preamble signal, may remain fixed for a given cell/BWP.

Repetition across symbols may be performed to generate the long preamble. For example, the basic waveform in each OFDM symbol can be repeated multiple times (as long as needed for the long preamble). The number of repetitions may depend on the exact values of M and N configured. If more detection delay can be tolerated, then CDM-2+TDM-2 configuration of CSI-RS or CSI-RS spanning a larger number of symbols can be configured.

As an alternative to use of a long preamble, the base station may transmit a PDCCH, and the UE may perform PDCCH based detection. In this case, the PDCCH should be contained within the symbols which the UE monitors for transmission. It may be noted that PDCCH detection performance is much worse than waveform detection and, hence, it may not be as good a candidate to improve reliability.

The start of the downlink transmission in the TXOP may be at pre-designated intervals (ex. slot or half-slot or mini-slot boundary) with respect to a beginning or end of the monitoring period. For example, it is envisioned that one or more default offsets may be standardized. Alternatively or additionally, an offset may be specified in the configuration transmitted to the UE. If UE is processing in frequency domain, the downlink transmission in the TXOP may start one or two symbols after the UE monitoring cycle to allow sufficient processing time for the UE.

The gNB maps the transmission to one of many possible carriers/BWPs. For operation based on BWPs, the gNB can configure one or more BWPs for each carrier (as per NR spec). Depending on the frequency in which the gNB clears the medium, the particular BWP is activated The long preamble can be considered an activation signal for the MVP. After the completion of the TXOP, the current MVP is considered to be de-activated and the UE goes back to monitoring the preamble on the default BWP. Notably, the default BWP would be in many cases the same as the current transmission BWP. Also, when the frequency is switched, CSI may not be useful and conservative scheduling may need to be used.

For operation based on multiple carriers, there are some concerns about multi-carrier operation. For example, the UE cannot transmit HARQ-ACKs of one carrier on another carrier, especially primary carrier ACKs on a secondary carrier unless the second carrier also has PUCCH configured. According to Release 15 of the 3GPP standards, only two PUCCHs are configured per carrier group. This restriction may be relaxed so that PUCCH on any carrier can be used to address this issue. Another concern with multiple carrier operation is that the UE performs radio resource management (RRM) and radio link management (RLM) and receives paging based on the primary carrier only. However, if the UE can be configured to perform RRM and RLM and monitor for paging on the active carrier (whether Pcell or SCell), then this issue can be addressed. This solution essentially suggests a carrier virtualization approach (rather than a multi-carrier approach) wherein the transmission frequency of the Pcell is determined dynamically but all other functions remain the same.

Turning now to FIG. 5, a method of wireless communication for a base station begins at block 500. Block 500 includes receiving, by the base station from a UE., an indication of UE capabilities regarding ability of the UE to monitor an integer M frequency band partitions. It is envisioned that the M frequency band partitions may correspond to carriers and/or band width parts (BWPs) of one or more carriers having one or more physical uplink control channels (PUCCHs) configured for the one or more carriers. For example, the M frequency band partitions may correspond to BWPs of only a primary carrier. Processing may proceed from block 500 to block 502.

Block 502 includes configuring, by the base station, the UE to monitor the M frequency band partitions for a predetermined signal according to a monitoring schedule. It is envisioned that, if the frequency band partitions correspond to carriers, then block 502 may include configuring, by the base station, the UE to perform radio resource management (RRM), perform radio link monitoring (RLM), and monitor for paging on the N frequency band partitions regardless of primary carrier and secondary carrier designations of the N frequency band partitions. Processing may proceed from block 502 to block 504.

Block 504 includes performing, by the base station, one or more successful clear carrier assessments (CCAs) on an integer N frequency band partitions of the M frequency band partitions, wherein N<M. Processing may proceed from block 504 to block 506.

Block 506 includes mapping, by the base station in response to the successful CCAs, one or more downlink transmissions to only the N frequency band partitions. Processing may proceed from block 506 to block 508.

Block 508 includes transmitting, by the base station based on the mapping, the predetermined signal on only the N frequency band partitions at least during one or more monitoring occasions defined by the monitoring schedule. It is envisioned that the predetermined signal may correspond to a preamble and/or a physical downlink control channel (PDCCH). In embodiments for which the predetermined signal corresponds to a preamble, it is envisioned that block 508 may include generating, by the base station, the preamble as a long preamble having a length sufficient to occupy all monitoring occasions defined by the monitoring schedule. Such generation may be achieved, for example, by repeating a basic preamble across two or more transmission symbols, wherein a number of repetitions is at least sufficient to allow the UE to cycle through all of the M frequency band partitions. It is envisioned that the basic preamble may correspond to a one port channel state information reference signal (CSI-RS) or a multi-port CSI-RS. It is also envisioned that the one port or multi-port CSI-RS may have a correlation sequence that is dependent on transmission symbol and slot index, and/or CSI-RS scrambling that remains fixed across transmission symbols for a given frequency band partition. Processing may proceed from block 508 to block 510.

Block 510 includes transmitting, by the base station based on the mapping, a downlink signal to the UE on only the N frequency band partitions during a transmission opportunity (TXOP) having a starting point defined by the monitoring schedule. It is envisioned that the starting point of the downlink signal may correspond to a slot boundary, a half slot boundary, or a mini slot boundary at an interval designated with respect to an end of a monitoring cycle defined by the monitoring schedule. Alternatively or additionally, it is envisioned that the starting point may be one or two transmission symbols following the end of the monitoring cycle defined by the monitoring schedule.

Turning now to FIG. 6, a method of wireless communication for a UP begins at block 600. Block 600 includes transmitting, by the user equipment (UE) to a base station, an indication of UE capabilities regarding ability of the UE to monitor an integer M frequency band partitions. It is envisioned that the M frequency band partitions may correspond to carriers and/or band width parts (BWPs) of one or more carriers having one or more physical uplink control channels (PUCCHs) configured for the one or more carriers. For example, the M frequency band partitions may correspond to BWPs of only a primary carrier. Processing may proceed from block 600 to block 602.

Block 602 includes receiving, by the UP from the base station, a configuration of the UE to monitor the M frequency band partitions for a predetermined signal according to a monitoring schedule. For example, it is envisioned that, if the band width partitions correspond to carriers, then block 602 may include receiving, by the UE from the base station, a configuration to perform radio resource management (RRM), perform radio link monitoring (RLM), and monitor for paging on the N frequency band partitions regardless of primary carrier and secondary carrier designations of the N frequency band partitions. Processing may proceed from block 602 to block 604.

Block 604 includes cycling, by the UE, through the M frequency band partitions while monitoring for the predetermined signal in monitoring occasions defined by the monitoring schedule. Processing may proceed from block 604 to block 606.

Block 606 includes detecting, by the UE during one or more of the monitoring occasions, the predetermined signal on only an integer N frequency band partitions of the M frequency band partitions, wherein N<M. It is envisioned that the predetermined signal may correspond to a preamble and/or a physical downlink control channel (PDCCH). In embodiments for which the predetermined signal corresponds to a preamble, it is envisioned that the preamble may have a length sufficient to occupy all monitoring occasions defined by the monitoring schedule. For example, the preamble may correspond to a basic preamble repeated across two or more transmission symbols, wherein a number of repetitions is at least sufficient to allow the UE to cycle through all of the M frequency band partitions. It is envisioned that the basic preamble may correspond to a one port channel state information reference signal (CSI-RS) or a multi-port CSI-RS. It is also envisioned that the one port or multi-port CSI-RS may have a correlation sequence that is dependent on transmission symbol and slot index, and/or CSI-RS scrambling that remains fixed across transmission symbols for a given frequency band partition. Processing may proceed from block 606 to block 608.

Block 608 includes tuning, by the UE in response to the detecting, to receive a downlink signal on only the N frequency band partitions during a transmission opportunity (TXOP) having a starting point defined by the monitoring schedule. It is envisioned that the starting point of the downlink signal may correspond to a slot boundary, a half slot boundary, or a mini slot boundary at an interval designated with respect to an end of a monitoring cycle defined by the monitoring schedule. Alternatively or additionally, it is envisioned that the starting point may be one or two transmission symbols following the end of the monitoring cycle defined by the monitoring schedule.

Figure 7:
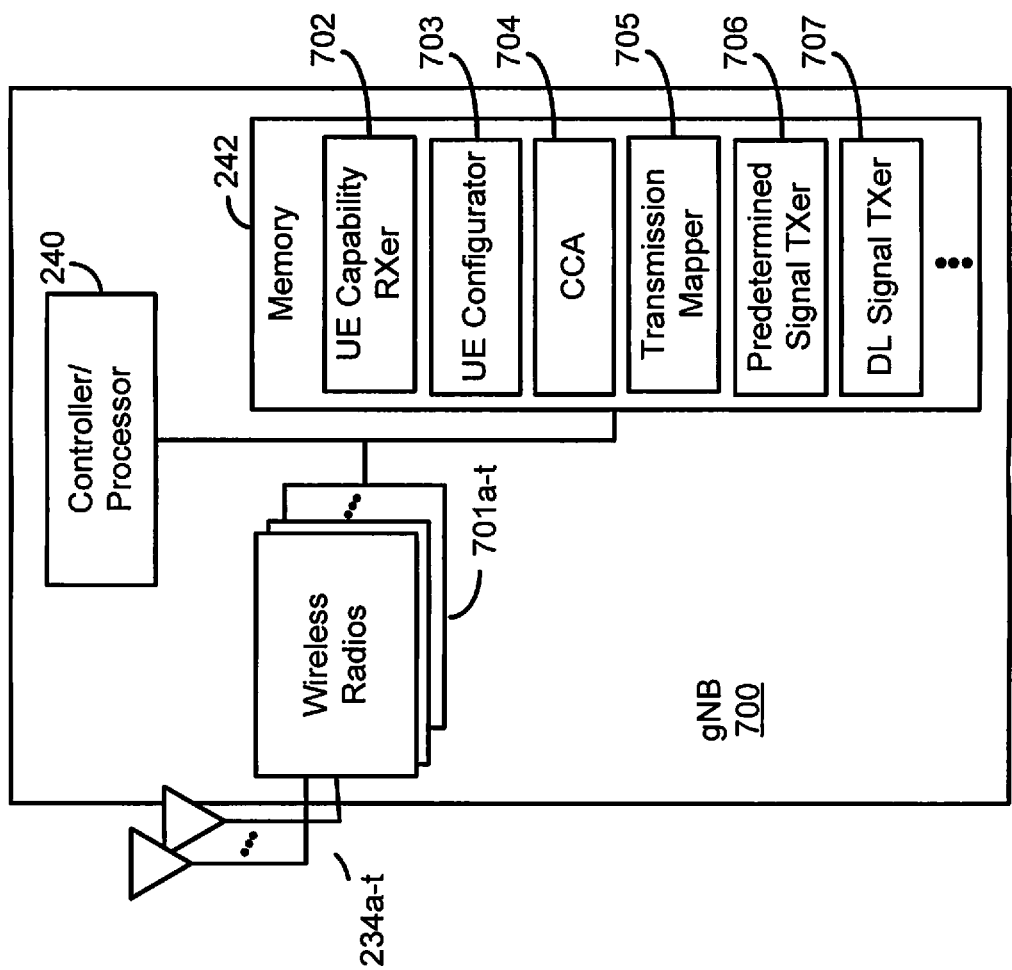
FIG. 7 is a block diagram illustrating a base station configured according to some embodiments of the present disclosure.

Turning now to FIG. 7, a base station 700, such as a NR-SS base station 105 (see FIG. 2), may have a controller/processor 240, a memory 242, and antennas 234a through 234t, as described above. The base station 700 may also have wireless radios 701a to 701t that comprise additional components also described above with reference to FIG. 2. The memory 242 of base station 700 stores algorithms that configure processor/controller 240 to carry out procedures as described above with reference to FIGS. 3-6.

Algorithms stored by memory 242 configure processor/controller 240 to carry out operations relating to wireless communication by the base station 700, as previously described. For example, UE capability receiver 702 configures controller processor 240 to carry out operations that include receiving, by the base station 700 from a UE, an indication of UE capabilities regarding ability of the UE to monitor an integer M frequency band partitions in any manner previously described. Additionally, UE configurator 703 configures controller processor 240 to carry out operations that include configuring, by the base station 700, the UE to monitor the M frequency band partitions for a predetermined signal according to a monitoring schedule in any manner previously described. Also, clear channel assessor 704 configures controller processor 240 to carry out operations that include performing, by the base station 700, one or more successful clear carrier assessments (CCAs) on an integer N frequency band partitions of the M frequency band partitions, N<M, in any manner previously described. Further, transmission mapper 705 configures controller processor 240 to carry out operations that include mapping, by the base station 700 in response to the successful CCAs, one or more downlink transmissions to only the N frequency band partitions in any manner previously described. Further, predetermined signal transmitter 706 configures controller processor 240 to carry out operations that include transmitting, by the base station 700 based on the mapping, the predetermined signal on only the N frequency band partitions at least during one or more monitoring occasions defined by the monitoring schedule in any manner previously described. Further, downlink signal transmitter 707 configures controller processor 240 to carry out operations that include transmitting, by the base station based on the mapping, a downlink signal to the UE on only the N frequency band partitions during a transmission opportunity (TXOP) having a starting point defined by the monitoring schedule in any manner previously described.

Figure 8:
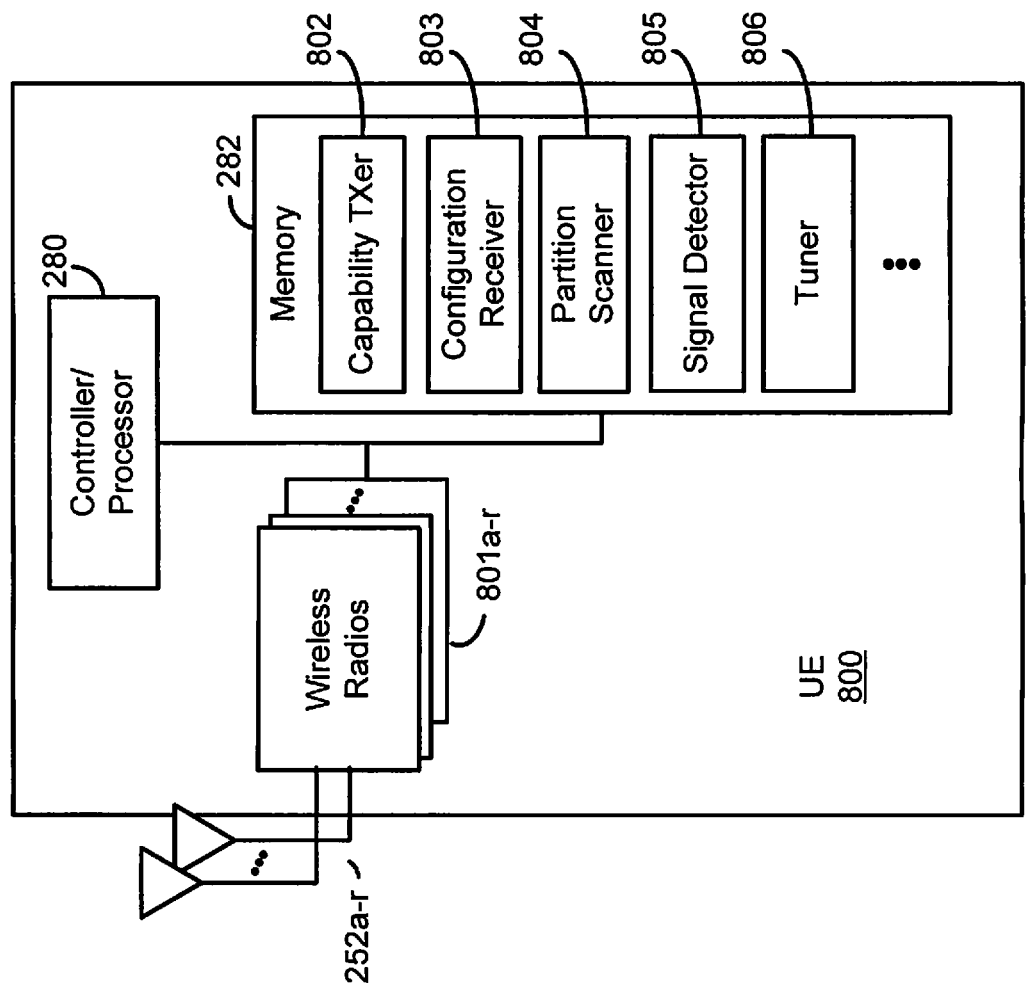
FIG. 8 is a block diagram illustrating a UE configured according to some embodiments of the present disclosure.

Turning now to FIG. 8, a UE 800, such as a UE 115 (see FIG. 2), may have a controller/processor 280, a memory 282, and antennas 252a through 252r, as described above. UE 800 may also have wireless radios 801a to 801r that comprise additional components also described above with reference to FIG. 2. The memory 282 of UE 800 stores algorithms that configure processor/controller 280 to carry out procedures as described above with reference to FIGS. 3-6.

Algorithms stored by memory 282 configure processor/controller 280 to carry out procedures relating to wireless communication by the UE 800, as previously described. For example, capability transmitter 802 configures controller processor 280 to carry out operations that include transmitting, by the UE 800 to a base station, an indication of UE capabilities regarding ability of the UE to monitor an integer M frequency band partitions in any manner previously described. Additionally, configuration receiver 803 configures controller processor 280 to carry out operations that include receiving, by the UE 800 from the base station, a configuration of the UE to monitor the M frequency band partitions for a predetermined signal according to a monitoring schedule in any manner previously described. Also, partition scanner 804 configures controller processor 280 to carry out operations that include cycling, by the UE 800, through the M frequency band partitions while monitoring for the predetermined signal in monitoring occasions defined by the monitoring schedule in any manner previously described. Further, signal detector 805 configures controller processor 280 to carry out operations that include detecting, by the UE during one or more of the monitoring occasions, the predetermined signal on only an integer N frequency band partitions of the M frequency band partitions, wherein N<M in any manner previously described. Further, tuner 806 configures controller processor 280 to carry out operations that include tuning, by the UE 800 in response to the detecting, to receive a downlink signal on only the N frequency band partitions during a transmission opportunity (TXOP) having a starting point defined by the monitoring schedule in any manner previously described.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 3-8) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, by a base station from a user equipment (UE), an indication of UE capabilities regarding ability of the UE to monitor an integer M frequency band partitions;
configuring, by the base station, the UE to monitor the M frequency band partitions for a predetermined signal according to a monitoring schedule;
performing, by the base station, one or more successful clear carrier assessments (CCAs) on an integer N frequency band partitions of the M frequency band partitions, wherein N<M;
mapping, by the base station in response to the successful CCAs, one or more downlink transmissions to the N frequency band partitions;
transmitting, by the base station based on the mapping, the predetermined signal on the N frequency band partitions at least during one or more monitoring occasions defined by the monitoring schedule; and
transmitting, by the base station based on the mapping, a downlink signal to the UE on the N frequency band partitions during a transmission opportunity (TXOP) having a starting point defined by the monitoring schedule, the starting point corresponds to at least one of: a slot boundary at an interval designated with respect to an end of a monitoring cycle defined by the monitoring schedule; a half slot boundary designated with respect to the end of the monitoring cycle defined by the monitoring schedule; a mini slot boundary designated with respect to the end of the monitoring cycle defined by the monitoring schedule; or one or two transmission symbols following the end of the monitoring cycle defined by the monitoring schedule.

2. The method of claim 1, wherein the M frequency band partitions correspond to at least one of:
carriers; or bandwidth parts (BWPs) of one or more carriers having one or more physical uplink control channels (PUCCHs) configured for the one or more carriers.

3. The method of claim 2, wherein the M frequency band partitions correspond to carriers, the method further comprising:
configuring, by the base station, the UE to perform radio resource management (RRM), perform radio link monitoring (RLM), and monitor for paging on the N frequency band partitions regardless of primary carrier and secondary carrier designations of the N frequency band partitions.

4. The method of claim 2, wherein the M frequency band partitions correspond to BWPs of a primary carrier.

5. The method of claim 1, wherein the predetermined signal corresponds to at least one of:
a preamble; or
a physical downlink control channel (PDCCH).

6. The method of claim 5, wherein the predetermined signal corresponds to a preamble, the method further comprising:
generating, by the base station, the preamble as a long preamble having a length sufficient to occupy all monitoring occasions defined by the monitoring schedule, wherein the generating the preamble includes repeating a basic preamble across two or more transmission symbols, wherein a number of repetitions is at least sufficient to allow the UE to cycle through all of the M frequency band partitions, wherein the basic preamble corresponds to at least one of a one port channel state information reference signal (CSI-RS) or a multi-port CSI-RS, and wherein the basic preamble has at least one of:
a correlation sequence that is dependent on transmission symbol and slot index; or
CSI-RS scrambling that remains fixed across transmission symbols for a given frequency band partition.

7. A method of wireless communication, comprising:
transmitting, by a user equipment (UE) to a base station, an indication of UE capabilities regarding ability of the UE to monitor an integer M frequency band partitions;
receiving, by the UE from the base station, a configuration of the UE to monitor the M frequency band partitions for a predetermined signal according to a monitoring schedule;
cycling, by the UE, through the M frequency band partitions while monitoring for the predetermined signal in monitoring occasions defined by the monitoring schedule;
detecting, by the UE during one or more of the monitoring occasions, the predetermined signal on an integer N frequency band partitions of the M frequency band partitions, wherein N<M; and
tuning, by the UE in response to the detecting, to receive a downlink signal on the N frequency band partitions during a transmission opportunity (TXOP) having a starting point defined by the monitoring schedule, the starting point corresponds to at least one of: a slot boundary at an interval designated with respect to an end of a monitoring cycle defined by the monitoring schedule; a half slot boundary designated with respect to the end of the monitoring cycle defined by the monitoring schedule; a mini slot boundary designated with respect to the end of the monitoring cycle defined by the monitoring schedule; or one or two transmission symbols following the end of the monitoring cycle defined by the monitoring schedule.

8. The method of claim 7, wherein the M frequency band partitions correspond to at least one of:
carriers; or
band width parts (BWPs) of one or more carriers having one or more physical uplink control channels (PUCCHs) configured for the one or more carriers.

9. The method of claim 8, wherein the M frequency band partitions correspond to carriers, the method further comprising:
receiving, by the UE from the base station, a configuration to perform radio resource management (RRM), perform radio link monitoring (RLM), and monitor for paging on the N frequency band partitions regardless of primary carrier and secondary carrier designations of the N frequency band partitions.

10. The method of claim 8, wherein the M frequency band partitions correspond to BWPs of a primary carrier.

11. The method of claim 7, wherein the predetermined signal corresponds to at least one of:
a preamble; or
a physical downlink control channel (PDCCH).

12. The method of claim 11, wherein the predetermined signal corresponds to a preamble having a length sufficient to occupy all monitoring occasions defined by the monitoring schedule, wherein the preamble corresponds to a basic preamble repeated across two or more transmission symbols, wherein a number of repetitions is at least sufficient to allow the UE to cycle through all of the M frequency band partitions, wherein the basic preamble corresponds to at least one of a one port channel state information reference signal (CSI-RS) or a multi-port CSI-RS, and wherein the basic preamble has at least one of:
a correlation sequence that is dependent on transmission symbol and slot index; or
CSI-RS scrambling that remains fixed across transmission symbols for a given frequency band partition.

13. An apparatus configured for wireless communication, the apparatus comprising:
at least one processor; and
a memory coupled to the at least one processor, wherein the at least one processor is configured:
to receive, by a base station from a user equipment (UE), an indication of UE capabilities regarding ability of the UE to monitor an integer M frequency band partitions;
to configure, by the base station, the UE to monitor the M frequency band partitions for a predetermined signal according to a monitoring schedule;
to perform, by the base station, one or more successful clear carrier assessments (CCAs) on an integer N frequency band partitions of the M frequency band partitions, wherein N<M;
to map, by the base station in response to the successful CCAs, one or more downlink transmissions to the N frequency band partitions;
to transmit, by the base station based on the maps, the predetermined signal on the N frequency band partitions at least during one or more monitoring occasions defined by the monitoring schedule; and
to transmit, by the base station based on the maps, a downlink signal to the UE on the N frequency band partitions during a transmission opportunity (TXOP) having a starting point defined by the monitors schedule, the starting point corresponds to at least one of: a slot boundary at an interval designated with respect to an end of a monitoring cycle defined by the monitoring schedule; a half slot boundary designated with respect to the end of the monitoring cycle defined by the monitoring schedule; a mini slot boundary designated with respect to the end of the monitoring cycle defined by the monitoring schedule; or one or two transmission symbols following the end of the monitoring cycle defined by the monitoring schedule.

14. The apparatus of claim 13, wherein the M frequency band partitions correspond to at least one of:
carriers; or
band width parts (BWPs) of one or more carriers has one or more physical uplink control channels (PUCCHs) configured for the one or more carriers.

15. The apparatus of claim 14, wherein the M frequency band partitions correspond to carriers, the apparatus further comprising configuration of the at least one processor:
to configure, by the base station, the UE to perform radio resource management (RRM), perform radio link monitors (RLM), and monitor for pages on the N frequency band partitions regardless of primary carrier and secondary carrier designations of the N frequency band partitions.

16. The apparatus of claim 14, wherein the M frequency band partitions correspond to BWPs of a primary carrier.

17. The apparatus of claim 13, wherein the predetermined signal corresponds to at least one of:
a preamble; or
a physical downlink control channel (PDCCH).

18. The apparatus of claim 17, wherein the predetermined signal corresponds to a preamble, the apparatus further comprising configuration of the at least one processor:
to generate, by the base station, the preamble as a long preamble has a length sufficient to occupy all monitors occasions defined by the monitors schedule.

19. The apparatus of claim 18, wherein configuration of the at least one processor to generate the preamble includes configuration of the at least one processor:
to repeat a basic preamble across two or more transmission symbols, wherein a number of repetitions is at least sufficient to allow the UE to cycle through all of the M frequency band partitions, wherein the basic preamble corresponds to at least one of a one port channel state information reference signal (CSI-RS) or a multi-port CSI-RS, and wherein the basic preamble has at least one of:
a correlation sequence that is dependent on transmission symbol and slot index; or
CSI-RS scrambling that remains fixed across transmission symbols for a given frequency band partition.

20. An apparatus configured for wireless communication, comprising:
at least one processor; and
a memory coupled to the at least one processor, wherein the at least one processor is configured:
to transmit, by a user equipment (UE) to a base station, an indication of UE capabilities regarding ability of the UE to monitor an integer M frequency band partitions;
to receive, by the UE from the base station, a configuration of the UE to monitor the M frequency band partitions for a predetermined signal according to a monitoring schedule;
to cycle, by the UE, through the M frequency band partitions while monitoring for the predetermined signal in monitoring occasions defined by the monitoring schedule;
to detect, by the UE during one or more of the monitors occasions, the predetermined signal on an integer N frequency band partitions of the M frequency band partitions, wherein N<M; and
to tune, by the UE in response to results of the configuration of the at least one processor to detect, to receive a downlink signal on the N frequency band partitions during a transmission opportunity (TXOP) having a starting point defined by the monitoring schedule, the starting point corresponds to at least one of: a slot boundary at an interval designated with respect to an end of a monitoring cycle defined by the monitoring schedule; a half slot boundary designated with respect to the end of the monitoring cycle defined by the monitoring schedule; a mini slot boundary designated with respect to the end of the monitoring cycle defined by the monitoring schedule; or one or two transmission symbols following the end of the monitoring cycle defined by the monitoring schedule.

21. The apparatus of claim 20, wherein the M frequency band partitions correspond to at least one of:
carriers; or
band width parts (BWPs) of one or more carriers has one or more physical uplink control channels (PUCCHs) configured for the one or more carriers.

22. The apparatus of claim 21, wherein the M frequency band partitions correspond to carriers, the apparatus further comprising configuration of the at least one processor:
to receive, by the UE from the base station, a configuration to perform radio resource management (RRM), perform radio link monitoring (RLM), and monitor for paging on the N frequency band partitions regardless of primary carrier and secondary carrier designations of the N frequency band partitions.

23. The apparatus of claim 21, wherein the M frequency band partitions correspond to BWPs of a primary carrier.

24. The apparatus of claim 20, wherein the predetermined signal corresponds to at least one of:
a preamble; or
a physical downlink control channel (PDCCH).

25. The apparatus of claim 24, wherein the predetermined signal corresponds to a preamble has a length sufficient to occupy all monitoring occasions defined by the monitoring schedule.

26. The apparatus of claim 25, wherein the preamble corresponds to a basic preamble repeated across two or more transmission symbols, wherein a number of repetitions is at least sufficient to allow the UE to cycle through all of the M frequency band partitions, wherein the basic preamble corresponds to at least one of a one port channel state information reference signal (CSI-RS) or a multi-port CSI-RS, and wherein the basic preamble has at least one of:
a correlation sequence that is dependent on transmission symbol and slot index; or
CSI-RS scrambling that remains fixed across transmission symbols for a given frequency band partition.

* * * * *